United States Patent
Dobner

(10) Patent No.: US 6,514,436 B1
(45) Date of Patent: Feb. 4, 2003

(54) APPARATUS AND METHOD FOR CLAMPING AND RELEASING CONTACT LENS MOLDS

(75) Inventor: Michael H. Dobner, Honeoye Falls, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 365 days.

(21) Appl. No.: 09/583,586

(22) Filed: May 31, 2000

(51) Int. Cl.[7] .............................................. B29D 11/00
(52) U.S. Cl. ..................... 264/1.1; 425/451.9; 425/453; 425/808
(58) Field of Search ........................ 264/1.1, 2.5, 40.6, 264/334; 425/149, 808, 450.1, 451.9, 453

(56) References Cited

U.S. PATENT DOCUMENTS

| | | | |
|---|---|---|---|
| 3,806,079 A | 4/1974 | Beattie | 249/126 |
| 4,284,399 A | 8/1981 | Newcomb | 425/410 |
| 4,747,982 A | 5/1988 | Nakatsukasa | 264/40.5 |
| 5,690,973 A | 11/1997 | Kindt-Larsen | 425/436 R |
| 5,693,268 A | 12/1997 | Widman | 264/1.1 |
| 5,850,107 A | 12/1998 | Kindt-Larsen | 264/1.1 |
| 5,866,170 A | 2/1999 | Fujieda | 425/40 |
| 5,914,074 A | 6/1999 | Martin | 264/1.38 |

FOREIGN PATENT DOCUMENTS

| | | | |
|---|---|---|---|
| DE | 2724002 | 12/1978 | B29D/11/00 |
| EP | 0750982 | 1/1997 | B29D/11/00 |

*Primary Examiner*—Mathieu D. Vargot
(74) *Attorney, Agent, or Firm*—Katherine McGuire

(57) ABSTRACT

Apparatus for clamping together contact lens molds having a polymerizable liquid monomer disposed therebetween includes a plurality of clamping assemblies each having a linearly translatable shaft member mounted to a contact lens curing table. A common mold clamp release assembly is provided through which each mold clamping assembly passes, thereby ensuring that each mold set is subjected to the same clamping and release profile. Additionally, the amount of clamping force of each clamping assembly may be individually adjusted by way of an adjustable nut mounted to the shaft member which, thereby, controls the amount of force delivered by the shaft member to the contact lens molds being clamped.

17 Claims, 6 Drawing Sheets

APPARATUS AND METHOD FOR CLAMPING AND RELEASING CONTACT LENS MOLDS

BACKGROUND OF THE INVENTION

The present invention relates generally to an apparatus and method for clamping together and releasing contact lens mold halves for manufacture of contact lenses, and more particularly to an apparatus and method for clamping multiple contact lens mold halves together by way of a single activating source while still providing means to individually adjust the clamping force being supplied to each pair of contact lens mold halves.

It is desirable to directly mold contact lenses rather than form the lenses by machining operations such as lathing. Generally, depositing a predetermined amount of curable substance, such as a polymerizable liquid monomer into a preformed mold cavity forms molded lenses. Thereafter, the liquid monomer is subjected to a curing source such as UV light or heat for a predetermined period of time until the monomer is properly cured. A soft contact lens results when the cured monomer form is separated from the molds and hydrated.

Generally, in the process briefly described above, a large number of contact lens molds are filled with the polymerizable liquid monomer at a station remote from the actual curing apparatus. Herein, the polymerizable liquid monomer is first injected into one (female) half of the mold assembly and then the second (male) half of the assembly is brought into contact with the first half. The opposing surfaces of the mold halves define the optical surface of a contact lens therebetween. The mold halves are lightly clamped together to allow transport from the monomer inject station to the clamping and curing station.

Once the contact lens molds are introduced to the clamping and curing station, it is recognized that problems may occur during the clamping and release procedure generally used in the past. For example, it is recognized that defects may appear in some lenses due to variations caused by providing individual clamping and release mechanisms associated with a respective mold. In previously known systems, the contact lens molds are arranged together in, for example, groups of three. Thereafter, the grouped lens molds are clamped together by individual clamping sources acting on each lens mold. In other words, a separate clamping and release source is provided for each contact lens mold being presented to the curing station. For example, three air cylinders would clamp three molds in a group, respectively, with the three air cylinders being extended and retracted by a common air line. With each group of molds having its own air line, variations were inevitably seen between each air line, and in both the extension and retraction velocities of the cylinders. In this case, each mold or groups of molds may see different clamping and release velocity profiles.

The present invention recognizes the problems that occur in contact lenses molded from a polymerizable material, which are not subjected to uniformly even clamping and release velocity profiles which are being applied to the lens mold halves. Problem areas are seen in improper edge formation, as well as defects in the optical portion of the lenses.

U.S. Pat. No. 5,914,074 to Martin et al entitled "Mold Clamping and Curing of a Polymerizable Hydrogel" discloses a clamping device for clamping together contact lens mold halves which have a polymerizable material, such as hydrogel, therebetween. The mold halves are clamped together with a predetermined force provided by way of an air cylinder, springs or weights for a predetermined period of time. The mold halves are formed of a material suitable to allow the polymerizable hydrogel material to be exposed to a curing source, such as UV light, to thereby cure the material to a gel-like state. Thereafter, the clamping pressure is removed and the mold halves having the partially cured hydrogel material disposed therebetween is moved to a further station for finish curing.

In addition to the above reference, U.S. Pat. Nos. 3,806,079; 4,284,399; 5,690,473; 5,693,268 and 5,850,107 disclose a liquid monomer clamped in a contact lens mold and polymerized to form a contact lens.

None of the above art solves the problems which occur when using the previously known contact lens clamping methods.

SUMMARY OF THE INVENTION

The present invention is directed toward an apparatus for accurately and repeatably clamping together multiple pairs of contact lens mold halves having a polymerizable liquid material contained between each pair. The clamped together contact lens mold halves are thereafter presented to an appropriate source for curing the polymerizable material to form contact lenses.

In this invention, a contact lens mold clamping assembly is presented which with accuracy and repeatability, clamps together and then releases multiple pairs of contact lens mold halves by utilizing a common source for activating the plurality of clamping mechanisms.

The contact lens mold clamping assembly may include a biasing mechanism coupled to each of the plurality of contact lens molds to enable the force being exerted thereon by the clamping assembly to be individually and accurately determined and set.

Further, this invention provides a contact lens mold clamping assembly and a common release mechanism for interaction with the clamping assembly to open the clamping assembly for introduction thereto of assembled contact lens molds, and thereafter releasing the clamps enabling the contact lens molds to be clamped by the clamping assembly. Because each clamp passes through the same, common release mechanism, each clamp sees the same, controlled linear motion profile.

DETAILED DESCRIPTION OF THE PREFERRED EMBODIMENT

Figure 1:
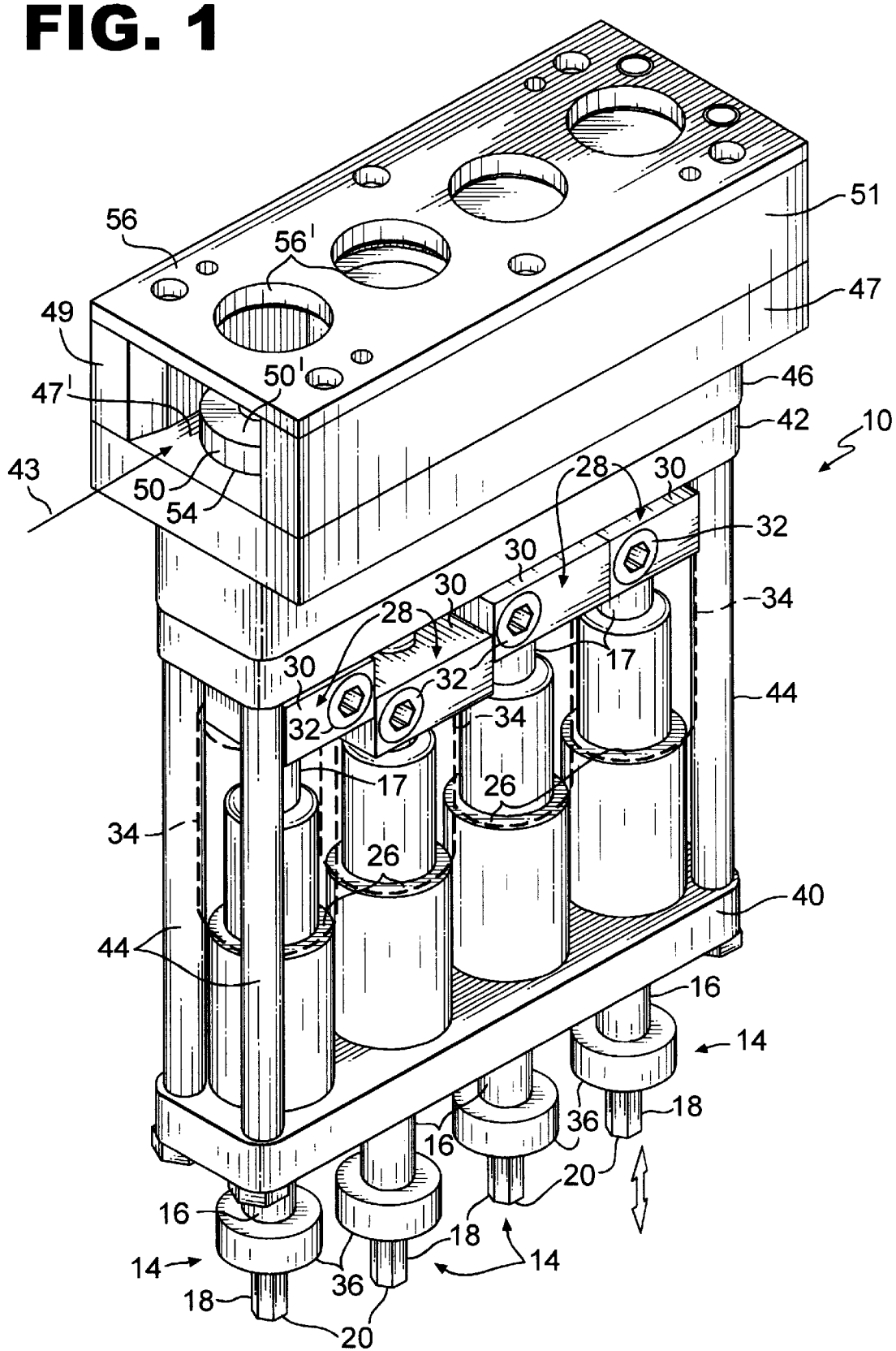
FIG. 1 is a perspective view of a mechanism for clamping together a plurality of contact lens mold halves, according to an embodiment of the invention.
Figure 2:
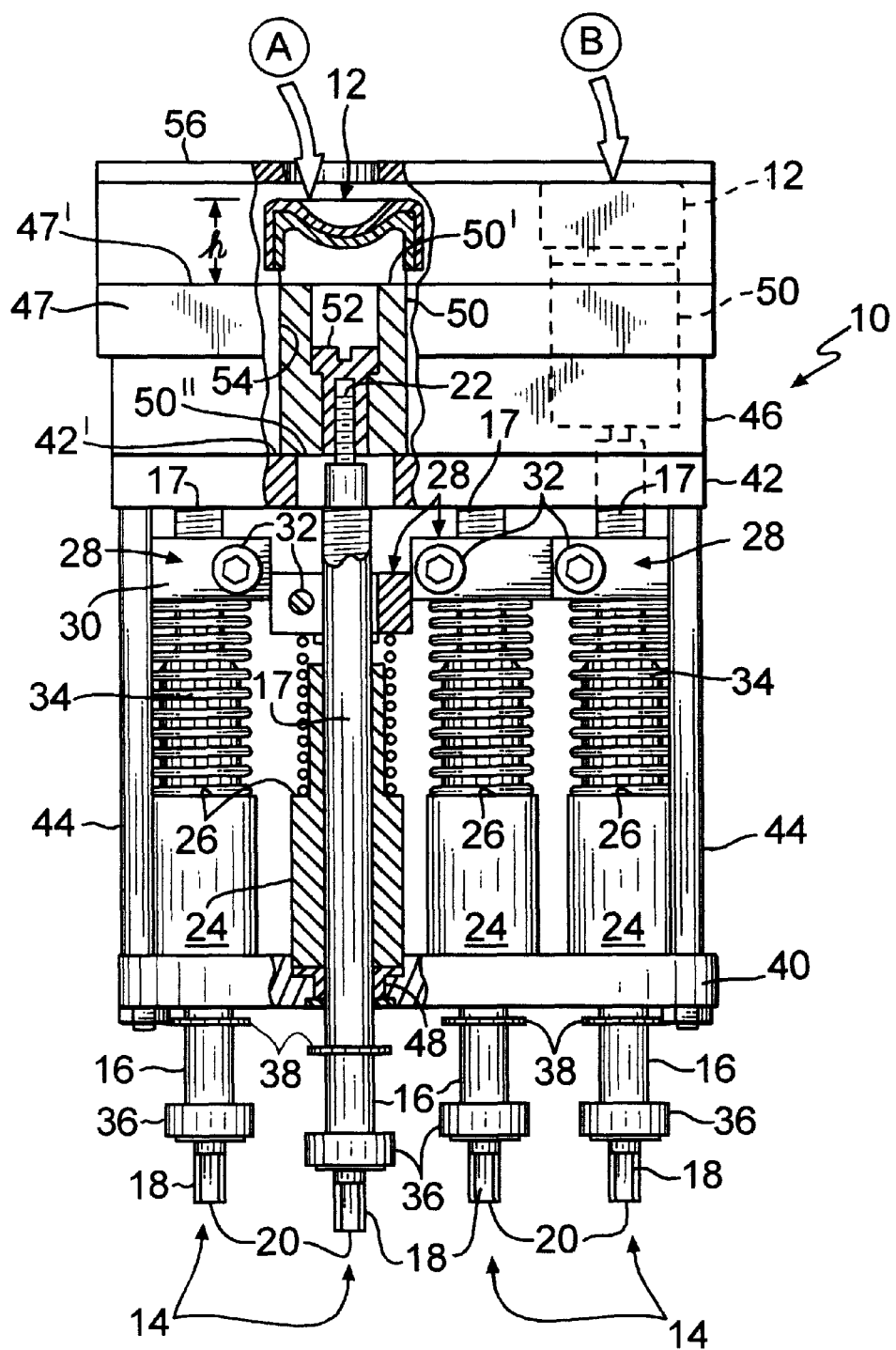
FIG. 2 is a front view, in partial cross-section, of the clamping mechanism of FIG. 1.
Figure 5:
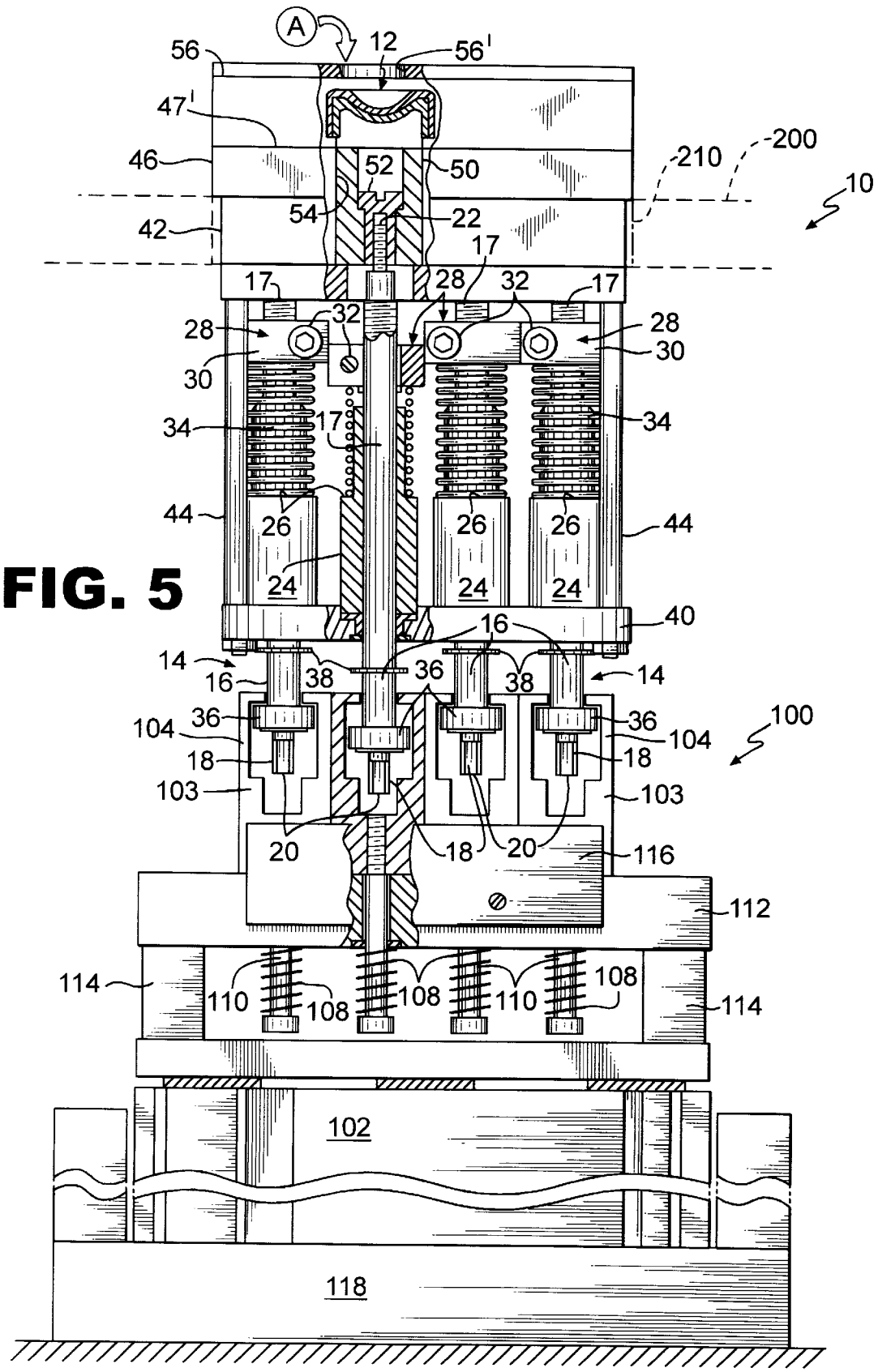
FIG. 5 is a view showing the clamping mechanism and release mechanism mounted to a carousel table and in engagement with each other.

The present invention is useful in the process of clamping together male and female molds in the process of forming soft contact lenses from a polymerizable material. As best illustrated in FIGS. 1, 2 and 5, a clamping assembly 10 is constructed so as to clamp together and hold assembled contact lens mold halves. Clamping assembly 10 may include sufficient space for positioning thereon four assembled lens molds 12, although depending upon preferences, either more or less mold capacity may be chosen.

Figure 4:
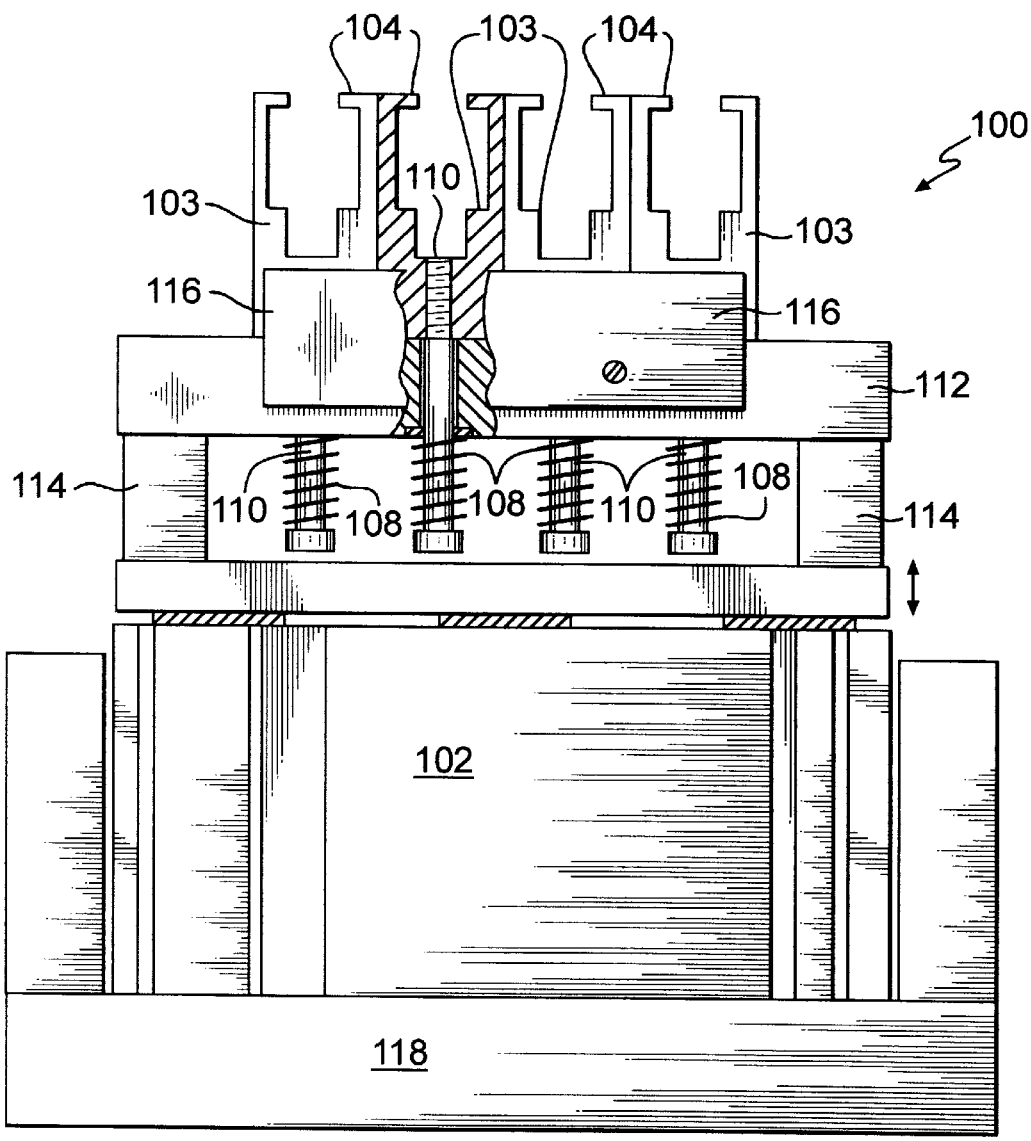
FIG. 4 is a front view, in partial cross-section, of the release mechanism of FIG. 3.

The clamping assembly 10 includes a plurality of spring loaded clamping members 14, each of which include a shaft 16, a central threaded portion 17, a hexagonal portion 18 formed at one end 20, and a threaded portion 22 formed at the end opposite end 20. A bushing 24 having a stepped portion 26 is received on central portion 17. An adjusting clamp 28 is mounted to threaded portion 17 of shaft 16 above stepped portion 26 of bushing 24. Adjusting clamp 28 includes a threaded split nut 30 and clamp screw 32 so as to enable split nut 30 to be adjustably positioned on, and locked to, threaded central portion 17. A coil spring 34 is mounted between the stepped portion 26 of bushing 24 and split nut 30. Further, each shaft 16 includes a bearing 36 and a retaining ring 38 mounted adjacent hexagonal portion 18 thereof. As best seen in FIGS. 2 and 4, a preselected number of the spring loaded clamping members 14 are mounted between lower mount 40 and upper mount 42 of clamping assembly 10 by a plurality of threaded spacer bolts 44. Still further, a locator block 46 is mounted to upper mount 42 and is also secured by spacer bolts 44. Shaft 16 may be journalled to lower mount 40 by way of annular bearing 48, as best shown in FIG. 2.

A bushing 50 is secured to threaded portion 22 of shaft 16 by way of internally threaded nut 52. Bushing 50 is dimensioned so as to be slidably received for reciprocal motion within aperture 54 formed within blocks 46,47. Further, as is seen in FIGS. 1 and 2, a clamping plate 56 is secured to locator block 46 a predetermined distance thereabove by parallel guide plates 49,51.

Figure 3:
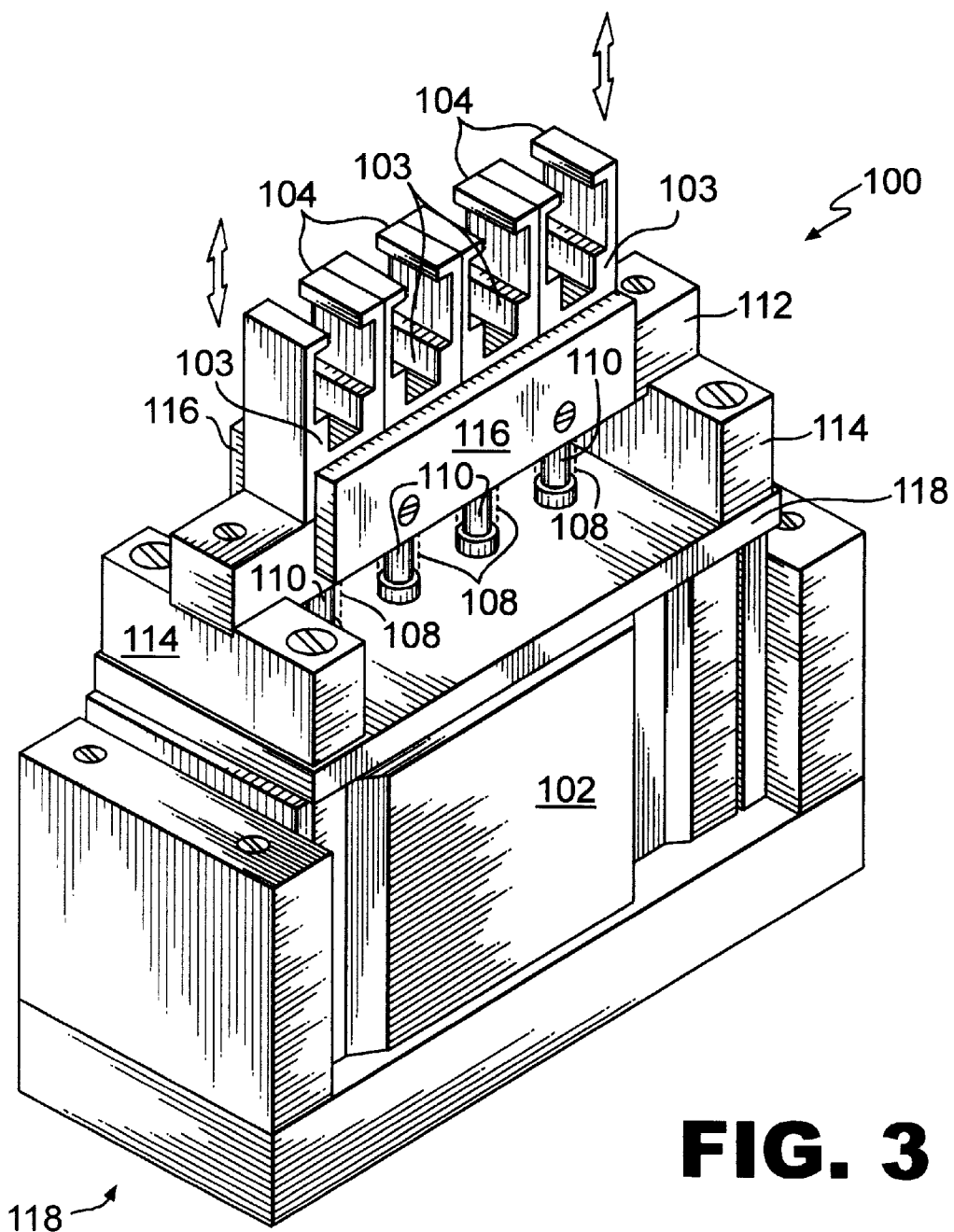
FIG. 3 is a perspective view of a release mechanism for coupling together with the clamping mechanism of FIGS. 1 and 2 to thereby release the clamping pressure applied to the contact lens mold halves.

Referring now to FIGS. 3 and 4, a clamp release mechanism 100 includes an actuator mechanism 102 (which may be an air cylinder, servo drive, stepper motor, or any other suitable source). Actuator 102 is coupled to a plurality of paired release fingers 104. The number of paired release fingers 104 equals the number of grouped contact lens molds 12 which are presented in the clamping assembly 10 as described hereinabove. Therefore, in this description the number of paired release fingers 104 in clamp release mechanism 100 is four, although more or less may be considered as pointed out above. The paired release fingers 104 are compliantly mounted by coil springs 108 and threaded shafts 110 to a block 112 which, in turn, is mounted to actuator mechanism 102 by way of spacers 114. A pair of guide plates 116 are longitudinally mounted to block 112, as best seen in FIG. 3. Actuator mechanism 102 includes a mounting plate 118.

Figure 6:
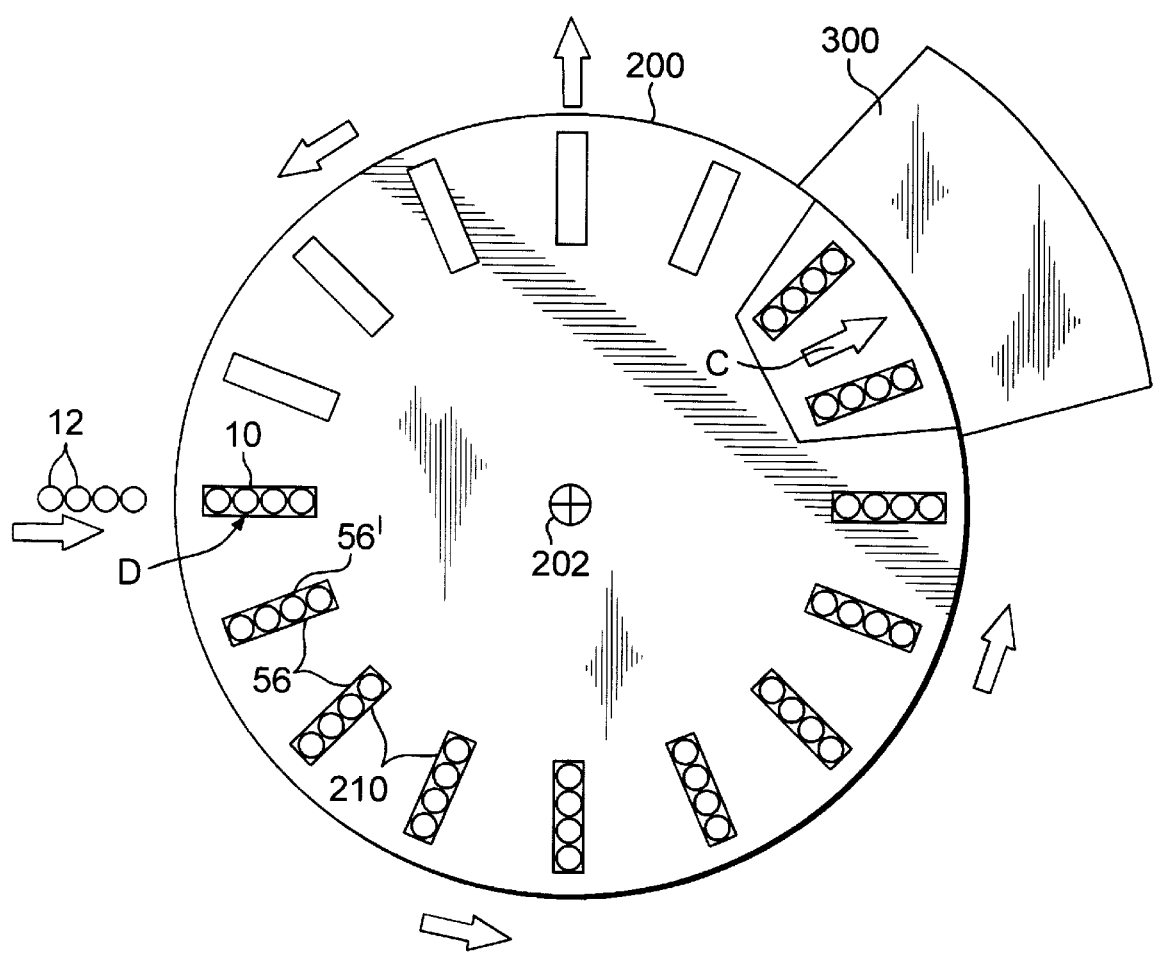
FIG. 6 is a schematic diagram of a carousel table used in clamping together contact lens molds and curing contact lenses contained therein.

In operation, a clamping assembly 10 is prepared for use in a contact lens curing station, such as a carousel table schematically shown in FIG. 6 which is well known in the art. To initially calibrate clamping assembly 10, each clamping assembly 10 would be set up in a test fixture (not shown) and subjected to a test procedure to determine if each of the individual clamping members 14 is applying a specific predetermined clamping force to the contact lens mold assemblies being clamped together. Each nut 30 may be individually adjusted until the desired clamping force is achieved. Accordingly, if, after taking the test reading there is a discrepancy in any one (or all) of the readings, it is a simple matter to adjust any one (or all) of the clamping assemblies 10 to achieve the desired results. This is done by simply loosening clamp screw 32 on split nut 30. Thereafter, an appropriate tool may be affixed to hexagonal end portion 18 of shaft 16 so that the shaft may be rotated. Depending upon the direction of rotation, split nut 30 moves either up or down the threaded portion 17 of shaft 16, as it can be seen that each individual split nut 30 bears against an adjacent split nut and, therefore, cannot rotate. Readings are taken in the test fixture as the adjustments are being made until the proper and desired reading is achieved. For example, as split nut 30 is moved upward on shaft 16, the force exerted by spring 34 against the test mold assembly is reduced whereas moving split nut 30 downward increases force, At this time, the clamp screw 32 is tightened and split nut 30 is locked to threaded portion 17 of shaft 16. Therefore, it will be appreciated that by so adjusting each clamping assembly 10, an integrated clamping assembly is provided which provides the exact clamping force to each contact lens mold assembly 12. After completing the procedures described above, each tested and calibrated clamp assembly 10 is mounted in a contact lens curing apparatus, such as the previously referenced carousel which is shown schematically in FIG. 6.

In actual production, the mold assemblies 12 may be introduced to the clamping assembly 10 along arrow 43 seen in FIG. 1. Prior to introducing the mold assemblies, a downward force is applied to each bearing 36 such that bushing 50 attached to shaft 16 is retracted to the flush position shown by arrow "A" in FIG. 2. In this position, the upper surface 50' of bushing 50 lies substantially flush with the upper surface 47' of plate 47. At this position, the lower surface 50" of bushing 50 abuts and stops against the upper surface 42' of plate 42. With referencing fixtures 50 retracted, the mold assemblies 12 may be pushed onto their respective bushing 50. The retractive force on bearings 36 is then released which, by way of the force exerted by coil spring 34 between bushing 24 and split nut 30, pushes the bushing 50 upwardly until the associated mold assembly is forced against clamping plate 56. Briefly, a carousel curing apparatus is a large, discshaped table 200 which is rotatably mounted to a central shaft 202. A significant number of contact lens mold clamping assembles 10 are mounted in annularly spaced relation to table 200 through complimentary shaped openings 210 formed adjacent the periphery of table 200. As table 200 is incrementally rotated about shaft 202, the clamp assemblies 10 are each individually opened (i.e., they are retracted to the "A" position of FIG. 2 in the manner described below), and a number (e.g., four at a time) of the contact lens molds 12, which have been previously filled with a liquid monomer and preliminarily capped, are shuttled along arrow 43 of FIG. 1 into respective clamp assemblies 10 on table 200. As table 200 continues to rotate, the clamping assemblies 10 are released whereby each lens mold 12 is clamped against associated plate 56 with the appropriate, calibrated force. Table 200 is equipped with an appropriate curing source such as UV lights such that the clamped molds 12 are subjected to UV radiation through table openings 210 and plate openings 56' as table 200 rotates the clamped assemblies toward a post-cure station 300. Once they reach station 300, the mold clamping assemblies 10 are retracted to the "A" position, and the mold assemblies 10 are shuttled off table 200 to a post-cure or other appropriate station 300, as indicated by arrow "C" in FIG. 6.

In a preferred embodiment of the present invention, a plurality of clamp assemblies 10 are mounted to an appropriate apparatus, such as the carousel table 200 described above and schematically illustrated in FIG. 6. Further, one or more clamp release mechanism 100 (FIGS. 3–5) are mounted, by way of an associated mounting plate 118, such that it is disposed directly below table 200 and clamp assemblies 10. Thus, while clamp assemblies 10 are fixed to and rotate with table 200, the clamp release mechanism 100 are fixed by mount 118 and do not rotate with table 200 or clamp assemblies 10.

More particularly, in the embodiment of FIG. 6 a clamp release mechanism 100 is positioned at mold load location "D" where the mold assemblies 12 are first shuttled onto table 200 in associated clamping assemblies 10. Further, a second clamp release mechanism 100 is positioned at mold exit location "C", where the mold assemblies, having been rotated by table 200 to location "C" from location "D", are shuttled off table 200 to a subsequent processing station 300.

Thus, clamp release mechanisms 100 are required at two distinct process steps: (1) at initial clamping of mold assemblies 12, and (2) at transfer of mold assemblies 12 from table 200 to subsequent processing station(s).

Referring to FIG. 5, each clamp release mechanism 100 includes one or more engaging members 103 having bifurcated fingers 104. In the embodiment shown, a group of four engaging members 103 are provided in a single clamp release mechanism 100 which equal in number the set of mold clamping members 14 on each assembly 10. The bifurcated fingers 104 are shaped, and the engaging members 103 are spaced, so that as table 200 incrementally rotates, the next clamping assembly 10 comes into alignment with the clamp release mechanism 100 with bearings 36 being received between the bifurcated fingers 104 of an associated engaging member 103 as seen best in FIG. 5. Once so positioned, actuator mechanism 102 is energized which retracts engaging members 103, and thus also fingers 104 downwardly, thereby pulling bearings 36 and clamping member 14 downwardly also to position "A", as shown in FIGS. 2 and 5. As previously stated, downward movement of clamping members 14 is limited by bushing lower surface 50" engaging plate upper surface 42'. In order to accommodate tolerance buildup between the meeting point of the bushing 50 and plate 42, and the meeting point of the upper surface of bearing 36 and the lower surface of the respective fingers 104, coil spring(s) 108 mounted to threaded shafts 110 will compress.

More particularly, actuator 102 is designed to pull the bifurcated fingers 104 to the retracted position (shown at "A" in FIG. 2). The bifurcated fingers 104 are guided in their up and down movement by way of parallel guide plates 116. Each clamping member 14 is, consequently, pulled down to the "A" position, which is sufficient to allow a predetermined number of contact lens molds 12 (e.g., four) filled with a polymerizable liquid monomer to be-shuttled (along arrow 43 of FIG. 1) into place on a respective clamping assembly 10. When each contact lens mold 12 is positioned on a respective bushing 50, actuator mechanism 102 is deactivated which releases the bifurcated fingers 104 to their extended position. With the load applied by fingers 104 thus removed, springs 34 bias against nuts 30 thereby causing upward extension of clamping members 14 and clamping of mold sets 12 between upper plate 56 and associated bushing 50. Again, each clamping member 14 has been previously calibrated so that springs 34 exert the correct force to mold sets 14.

As table 200 is incrementally indexed, the clamping assembly 10 which has clamped mold sets 12 held therein as described above, proceeds to rotate with table 200 while clamp release mechanism 100 in which it was engaged remains stationary. As such, bearings 36 exit from between their respective bifurcated fingers 104, travelling toward station 300 with table 200. It will thus be appreciated that mold sets 12 are in the clamped "B" position as they travel between mold load location "D" and mold exit location "C" of table 200. The elapsed time between stations "D" and "C" is predetermined and set according to known criteria for polymerizing the monomer contained within the mold sets 12.

As stated above, a second release assembly is located at location "C" to permit the unclamping of mold sets 12 and transport thereof off table 200 and to station 300. Again, the mounting of clamp release mechanism 100 is such that bifurcated fingers 104 are aligned to receive a respective bearing 36 of successively indexed clamp assemblies 10 of table 200. Once the respective clamping assembly 10 has aligned with the clamp release mechanism 100 at location "C", associated actuator 102 is energized, thereby retracting engaging members 103 and respective clamping members 14 which are thus moved downwardly to the "A" position. The previously clamped mold sets 12 are thus free to be shuttled off table 200 to station 300 for subsequent processing as desired. Once the mold sets 12 have been shuttled off table 200, actuator 102 is released, thereby returning associated clamping members 14 to their extended "B" positions, absent the mold sets 12 which have been transported to station 300 as described above. The now "empty" clamping assembly 10 continues travel with table 200 back toward the mold loading station "D" as seen in FIG. 6. The cycle is then repeated, with each empty clamping assembly 10 being successively indexed to mold loading station "D" where assembly 10 comes into alignment with the clamp release mechanism 100 positioned at station "D".

It will thus be appreciated that each group of mold sets 10 passes through the same release assemblies, one at mold load location "D", and the other at mold exit location "C". As such, each incrementally indexed mold set 10 on table 200 is subjected to the same clamping and release profile. This is a vast improvement over the prior art in that the variability seen between different mold sets of the prior art method have been eliminated. Furthermore, tolerance buildup variability between the different clamping assemblies has been substantially eliminated through the compliant mounting of the clamping release members.

Lastly, it will be recognized from the preceding description regarding the testing and calibration procedure performed on each clamping assembly 10 and each clamping member 14, that the clamping force exerted on each contact lens mold 12 may be precisely controlled and equalized across all mold sets 12. Accordingly, previously accepted, yet undesirable variables in producing molded contact lenses has been eliminated.

While the invention has been shown and described with respect to the preferred embodiments thereof, it will be understood by those skilled in the art that the foregoing and other changes in form and details may be accomplished without departing from either the spirit or scope of the invention which should be limited only by the scope of the claims appended hereto.

What is claimed is:

1. A clamping assembly for clamping a lens mold having mating female and male mold sections having a quantity of liquid lens-forming material therebetween for forming a lens, said clamping assembly comprising:

a) a reference fixture having an upper surface configured for the removable seating of said lens mold thereon;

b) an upper plate positioned in spaced relation to said reference fixture with said upper surface of said fixture facing said upper plate;

c) linear translation means coupled to said reference fixture and operable to alternately move said reference fixture between a retracted position whereby said spacing between said fixture upper surface and said upper plate is greater than the height "h" of said lens mold, and an extended position whereby said fixture moves with said mold toward said upper plate until said mold abuts said upper plate and is clamped between said reference fixture and said upper plate; and d) means biasing said reference fixture in said extended position, said biasing means being selectively adjustable to a predetermined biasing force.

2. The clamping assembly of claim 1, wherein said linear translation means comprises a shaft connected to said reference fixture at one end thereof and to a linear actuator at the end opposite said one end thereof.

3. The clamping assembly of claim 2, wherein said shaft is threaded and said biasing means comprises a helical spring surrounding said shaft, said spring being fixed at one end thereof and a nut adjustably positioned on said shaft at the end of said spring opposite said one end, said adjustment of said nut on said shaft being operable to adjust said biasing force of said spring.

4. The clamping assembly of claim 3 wherein said nut is a split nut having a set screw, and said shaft having means formed thereon for rotating said shaft relative to said nut, thereby adjusting the position of said nut on said shaft.

5. The clamping assembly of claim 3, and further comprising a bushing fixing said spring one end, said bushing being attached to a mounting plate through which said threaded shaft extends.

6. The clamping assembly of claim 1, and further comprising a plate through which said referencing fixture extends, said plate having an upper surface which lies substantially flush with said fixture upper surface when said clamping assembly is moved to said retracted position.

7. The clamping assembly of claim 1 wherein said upper plate includes an opening aligned with said lens mold whereby monomer curing means may pass to reach said lens mold.

8. The clamping assembly of claim 2, and further comprising a clamping release assembly connected to said linear actuator and movable therewith, said clamping release assembly comprising an engagement member configured for releasable engagement to said shaft opposite end and to move said shaft against said biasing means and thereby move said referencing fixture to said retracted position.

9. The clamping assembly of claim 8, and further comprising a bearing mounted to said shaft opposite end, said engagement member including a pair of spaced fingers between which said bearing is removably positioned, said fingers configured for engaging said bearing upon activation of said actuator and movement of said shaft and said reference fixture to said retracted position.

10. The clamping assembly of claim 9, wherein said engaging member includes a shaft extending from the end thereof opposite said fingers, and further comprising a block having an opening through which said shaft of said engaging member extends, said shaft having a coil spring attached thereto on the side of said block opposite said fingers, said coil spring operable to bias said engaging members against said block.

11. The clamping assembly of claim 10, and further comprising a lens mold loading station and a lens mold exit station, said lens mold loading station having means for positioning said lens mold onto said reference fixture upper surface when said fixture is in said retracted position, said lens mold exit station having means for removing said lens mold from said reference fixture upper surface.

12. The clamping assembly of claim 1, and further comprising a rotating table to which said clamping assembly is mounted.

13. The clamping assembly of claim 12, and further comprising a lens mold loading station and a lens mold exit station, said lens mold loading station having means for positioning said lens mold onto said reference fixture upper surface when said fixture is in said retracted position, said lens mold exit station having means for removing said lens mold from said reference fixture upper surface.

14. The clamping assembly of claim 13 wherein a mold clamping release assembly is positioned at each of said mold load station and said mold exit station.

15. The clamping assembly of claim 14 wherein said table is round and a plurality of said clamping assemblies are mounted in annularly spaced relation about and adjacent to the perimeter of said table whereby said clamping assemblies rotate with the rotation of said table.

16. The clamping assembly of claim 10, and further comprising a lens mold loading station and a lens mold exit station, said lens mold loading station having means for positioning said lens mold onto said reference fixture upper surface when said fixture is in said retracted position, said lens mold exit station having means for removing said lens mold from said reference fixture upper surface.

17. A method for clamping a lens mold having mating female and male mold sections having a quantity of liquid lens-forming material therebetween for forming a lens, said method comprising the steps of:

a) providing a reference fixture having an upper surface configured for the removable seating of said lens mold thereon;

b) providing an upper plate positioned in spaced relation to said reference fixture with said upper surface of said fixture facing said upper plate;

c) providing linear translation means coupled to said reference fixture and operable to alternately move said reference fixture between a retracted position whereby said spacing between said fixture upper surface and said upper plate is greater than the height "h" of said lens mold, and an extended position whereby said fixture moves with said mold toward said upper plate until said mold abuts said upper plate and is clamped between said reference fixture and said upper plate; and d) providing means biasing said reference fixture in said extended position, said biasing means being selectively adjustable to a predetermined biasing force.

\* \* \* \* \*